(12) United States Patent
Jonsson

(10) Patent No.: US 7,182,573 B2
(45) Date of Patent: Feb. 27, 2007

(54) WIND TURBINE

(76) Inventor: Stanley Jonsson, 442 Hillcrest Rd., San Mateo, CA (US) 94402

( * ) Notice: Subject to any disclaimer, the term of this patent is extended or adjusted under 35 U.S.C. 154(b) by 133 days.

(21) Appl. No.: 10/996,675

(22) Filed: Nov. 24, 2004

(65) Prior Publication Data

US 2006/0110251 A1    May 25, 2006

(51) Int. Cl.
F01D 1/06    (2006.01)
(52) U.S. Cl. ....................... 415/183; 415/906
(58) Field of Classification Search ............... 415/4.2, 415/4.4, 203, 183, 188, 905, 906; 416/132 B, 416/93 R, 93 A, 245 R; 290/43, 44, 54, 290/55
See application file for complete search history.

(56) References Cited

U.S. PATENT DOCUMENTS

| | | | |
|---|---|---|---|
| 543,462 A * | 7/1895 | Bramwell | 290/44 |
| 4,350,900 A * | 9/1982 | Baughman | 290/55 |
| 4,659,940 A * | 4/1987 | Shepard | 290/55 |
| 4,818,888 A * | 4/1989 | Lenoir, III | 290/43 |
| 4,832,569 A * | 5/1989 | Samuelsen et al. | 416/17 |
| 5,083,899 A * | 1/1992 | Koch | 415/2.1 |
| 5,591,004 A * | 1/1997 | Aylor | 416/42 |
| 5,765,990 A * | 6/1998 | Jones | 415/2.1 |
| 6,015,258 A | 1/2000 | Taylor | |
| 6,064,123 A | 5/2000 | Gislason | |
| 6,629,815 B2 | 10/2003 | Lusk | |
| 2002/0015639 A1 | 2/2002 | Roberts | |
| 2002/0079705 A1 | 6/2002 | Fowler | |
| 2002/0187038 A1 | 12/2002 | Streetman | |
| 2003/0025335 A1 | 2/2003 | Elder | |
| 2003/0035725 A1 | 2/2003 | Sosonkina | |
| 2003/0042743 A1 | 3/2003 | Gingras et al. | |
| 2003/0049128 A1 | 3/2003 | Rogan | |
| 2003/0056506 A1 | 3/2003 | Cutcher | |
| 2003/0223858 A1 | 12/2003 | O'Connor et al. | |
| 2003/0235498 A1 | 12/2003 | Boatner | |
| 2004/0001752 A1 | 1/2004 | Noble | |
| 2004/0036297 A1 | 2/2004 | John | |
| 2004/0041407 A1 | 3/2004 | Petterson et al. | |
| 2004/0042894 A1 | 3/2004 | Smith | |
| 2004/0071541 A1 | 4/2004 | Rainbow | |
| 2004/0141843 A1 | 7/2004 | Blank et al. | |
| 2004/0141845 A1 | 7/2004 | Ohlmann | |

* cited by examiner

Primary Examiner—Edward K. Look
Assistant Examiner—Devin Hanan
(74) Attorney, Agent, or Firm—Gordon & Rees, LLP

(57) ABSTRACT

A wind turbine, with: a rotatable frame; a plurality of airfoils mounted to the rotatable frame, wherein the airfoils extend parallel to an axis of rotation of the rotatable frame; a wind block positioned to restrict airflow over at least a portion of the rotatable frame; and at least one drive wheel in contact with the rotatable frame.

9 Claims, 5 Drawing Sheets

WIND TURBINE

TECHNICAL FIELD

The present invention relates to wind turbines used for producing electricity.

BACKGROUND OF THE INVENTION

Many wind turbine designs already exist for producing electricity. Most commonly, such designs involve a single large propeller mounted at the top end of a vertical mast. Air flow across the propeller causes the propeller to turn, which in turn rotates a generator to produce electricity.

Such conventional wind turbines suffer numerous disadvantages. First, they involve large propellers that must are mounted a considerable distance above the ground. Thus, they require a tall and sturdy mast to which the propeller is mounted. A second disadvantage of large rotating propeller blade systems is that they tend to kill a large number of birds. A third disadvantage of such designs is that the generator is typically positioned at the center of the rotating blades. Thus, the generator is mounted at the top of the mast along with the propeller. This requires the mast to be sufficiently strong to support both the propeller and the generator. As a result, it is difficult to access the turbine for repairs and servicing. A fourth disadvantage of conventional propellers is that the blades rotate in a direction perpendicular to the wind direction. As a result, propeller blade velocity through the air increases with the distance from the center of rotation of the propeller. This unfortunately requires a variable and complex blade section geometry.

SUMMARY OF THE INVENTION

The present invention provides a novel wind turbine design having numerous advantages over conventional wind turbine systems.

In one preferred embodiment, the present invention provides a wind turbine, having a rotatable frame with a plurality of airfoils mounted thereto, wherein the airfoils extend parallel to the axis of rotation of the rotatable frame; a wind block positioned to restrict airflow over at least a portion of the rotatable frame; and at least one generator drive wheel in contact with the rotatable frame.

The rotatable frame preferably includes: a first circular rotatable member; and a second circular rotatable member, wherein the airfoils span between the first and second rotatable members. The first and second rotatable members are preferably parallel to one another and rotate about a common horizontal axis. Thus, each of the airfoils are preferably horizontal, and disposed parallel to the axis of rotation of the rotatable frame. As a result, air flow perpendicular to the axis of rotation of the rotatable frame causes the rotatable frame to rotate. This allows the same airfoil cross section to be used across the entire width of the airfoil spanning between the first and second rotatable members. Using the same cross section along the entire width of the airfoil offers several advantages, as follows.

First, power output of the present wind turbine can be increased simply by increasing the width of the rotatable frame. In contrast, with conventional propellers, it is necessary to increase the diameter of the propellers to increase the system's power output. Making larger and larger diameter propellers is disadvantageous in that it requires such propellers to be mounted higher and higher from the ground.

In another preferred embodiment, the present invention provides a wind turbine having a circular rotatable frame with a propeller disposed therein; a drive wheel in contact with the circular rotatable frame, wherein the drive wheel is positioned below an axis of rotation of the rotatable frame; and an alignment wheel positioned to urge the circular rotatable frame into contact with the drive wheel. In this second embodiment of the invention, air flow parallel to the axis of rotation of the rotatable members causes the rotatable members to rotate.

In its various embodiments, the present invention also may include at least one alignment wheel positioned to urge at least one of the circular rotatable frame members into contact with the drive wheel. Optionally, first and second alignment wheels are used to restrain motion of at least one of the circular rotatable frame member in perpendicular directions.

A first advantage of the present wind turbine is that it is simple and considerably less costly to build and operate than conventional wind turbine designs. As will be shown, the present invention can be made from standard materials, including components used in mass transit and amusement park rides, and also construction equipment components.

A second advantage of the present invention is that the generator drive wheel is positioned to contact the outer perimeter of the rotatable frame of the device. In contrast, existing wind turbines operate with their generator drive in contact with a rotating mechanism that is disposed at the center of a rotating propeller. As a result, the present system offers gearing advantages due to the comparatively large sized circular frame in contact with the comparatively small sized drive wheel. As a result, even a small speed of rotation of the circular frame translates into a fast rotation of the generator drive wheel.

A third advantage is that the present invention has a low center of gravity. Therefore, the present wind turbine is very stable. Moreover, the present system does not require a strong, heavy mast to support a propeller and turbine some distance above the ground. This considerably reduces the weight and size limitations of the present system, resulting in cost savings as compared to traditional designs. Furthermore, having the generator drive wheel (and the turbine itself) positioned close to the ground permits easy access for turbine/drive system repairs and servicing.

A fourth advantage of the present airfoil design is that each of the airfoils experience the same wind velocity along the entire length of their leading edge. Equal wind velocity at all points along the leading edge of the airfoil allows a single simplified airfoil cross section along the entire airfoil length. Thus, the wind turbine horizontal width and not its vertical diameter determines power generation. Moreover, having the airfoils disposed at the perimeter of the device results in the longest possible torque lever arm. This results in the most torque per unit of airfoil force generation.

A fifth unique advantage of the present invention is that the interior of the wind turbine is essentially free of moving structural members. In a preferred embodiment, a portion of the air flow can therefore be diverted through an air duct from the front side of the rotating frame to a back side of the rotating frame. As a result, air flow acts on airfoils disposed on both the front and back sides of the rotating frame. Such use of "bypass air" ducting permits the present invention to increase its power production capability. In addition, modulation of the amount of such bypass air can be used to provide rotational speed control to the rotating frame and the connected generator.

DETAILED DESCRIPTION OF THE DRAWINGS

Figure 4:
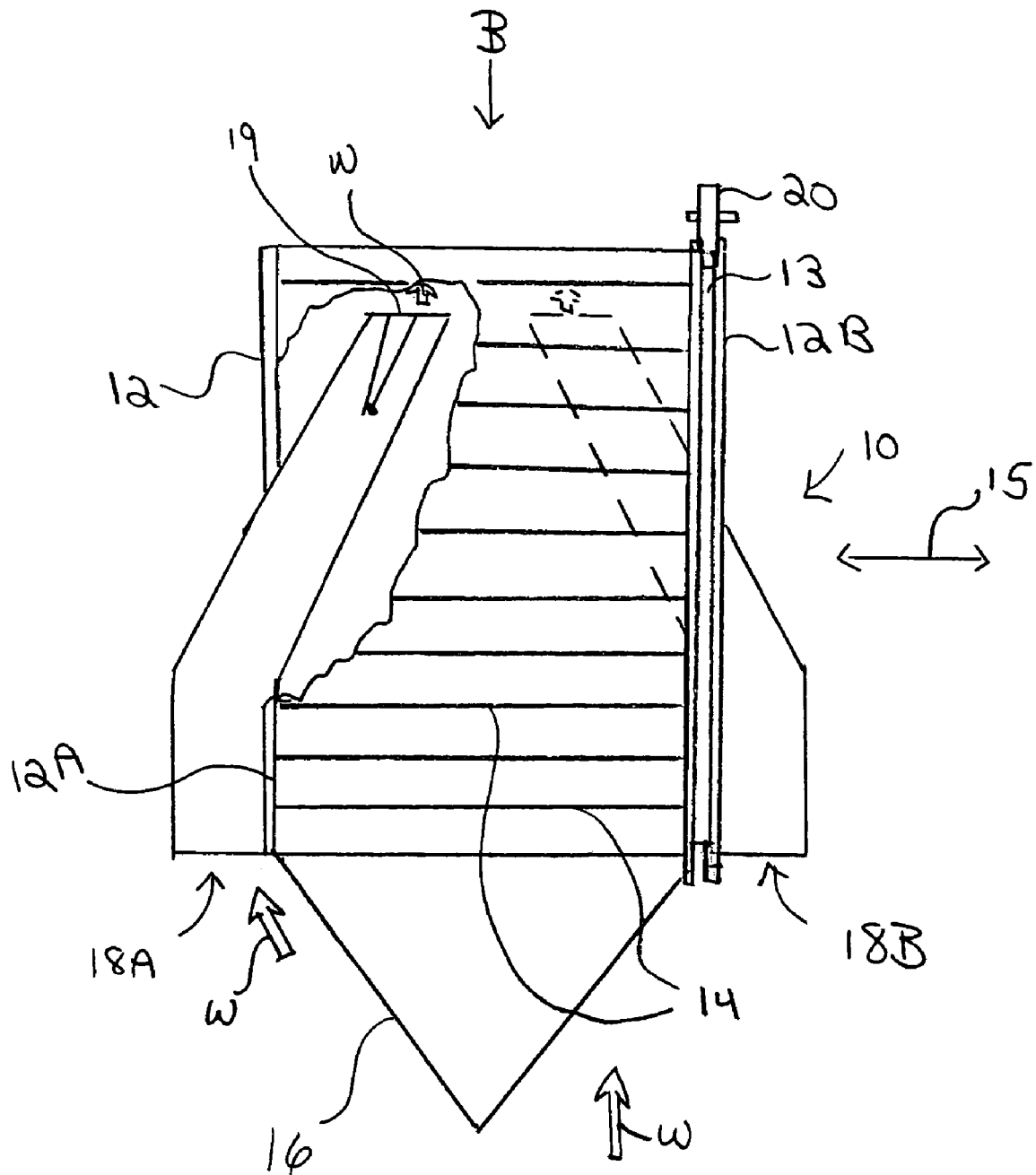
FIG. 4 is a top plan view corresponding to FIG. 1 (with a cut away section showing the bypass air ducting).
Figure 5:
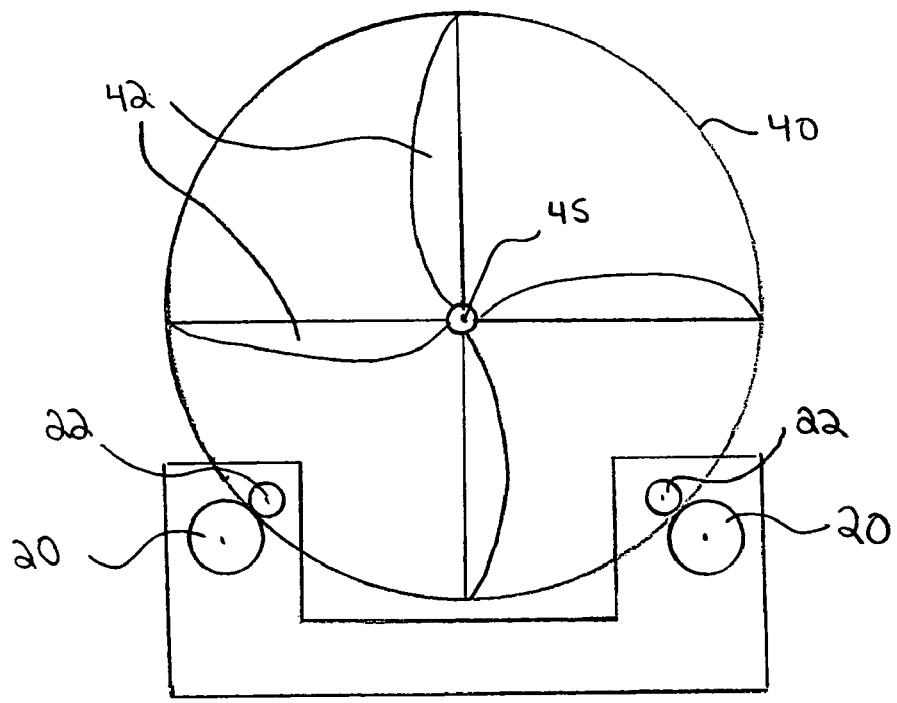
FIG. 5 is a front elevation view of a second embodiment of the invention.
Figure 6:
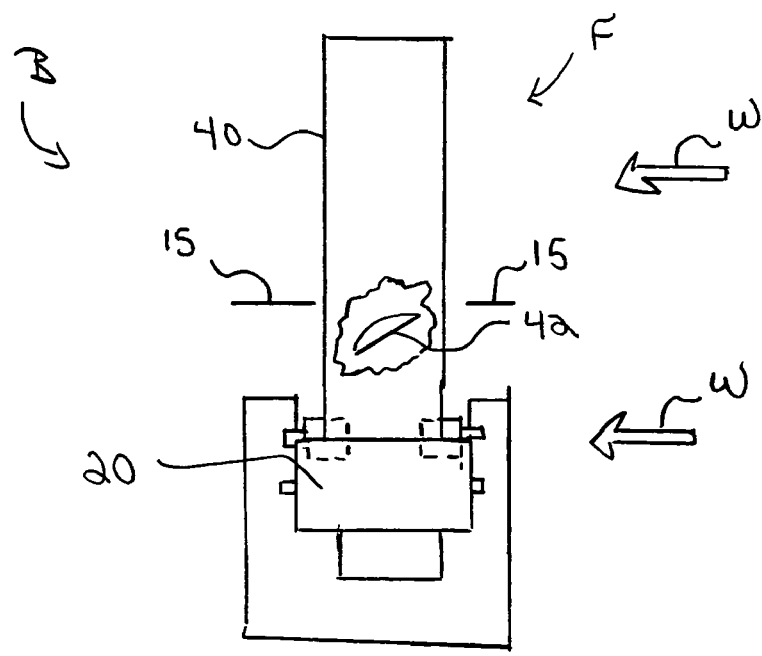
FIG. 6 is a side elevation view corresponding to FIG. 5 (with a cut away section showing the propeller).

The present invention provides a novel wind turbine design. FIGS. 1 to 4 show a first embodiment of the invention in which air flow perpendicular to the axis of rotation of the device causes device to rotate. FIGS. 5 and 6 show a second embodiment of the invention in which air flow parallel to the axis of rotation of the device causes device to rotate.

Figure 1:
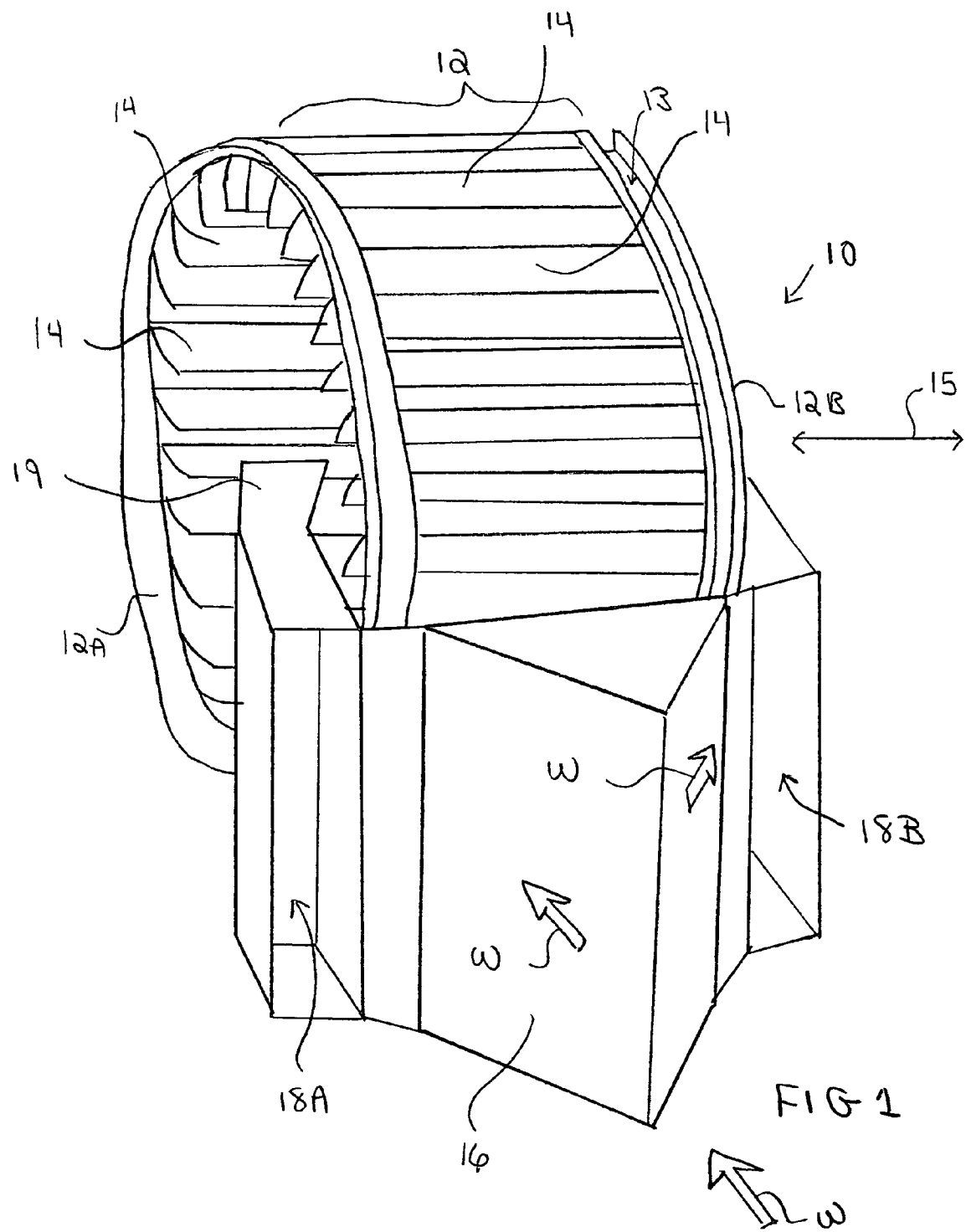
FIG. 1 is a front perspective view of a first embodiment of the wind turbine.
Figure 2:
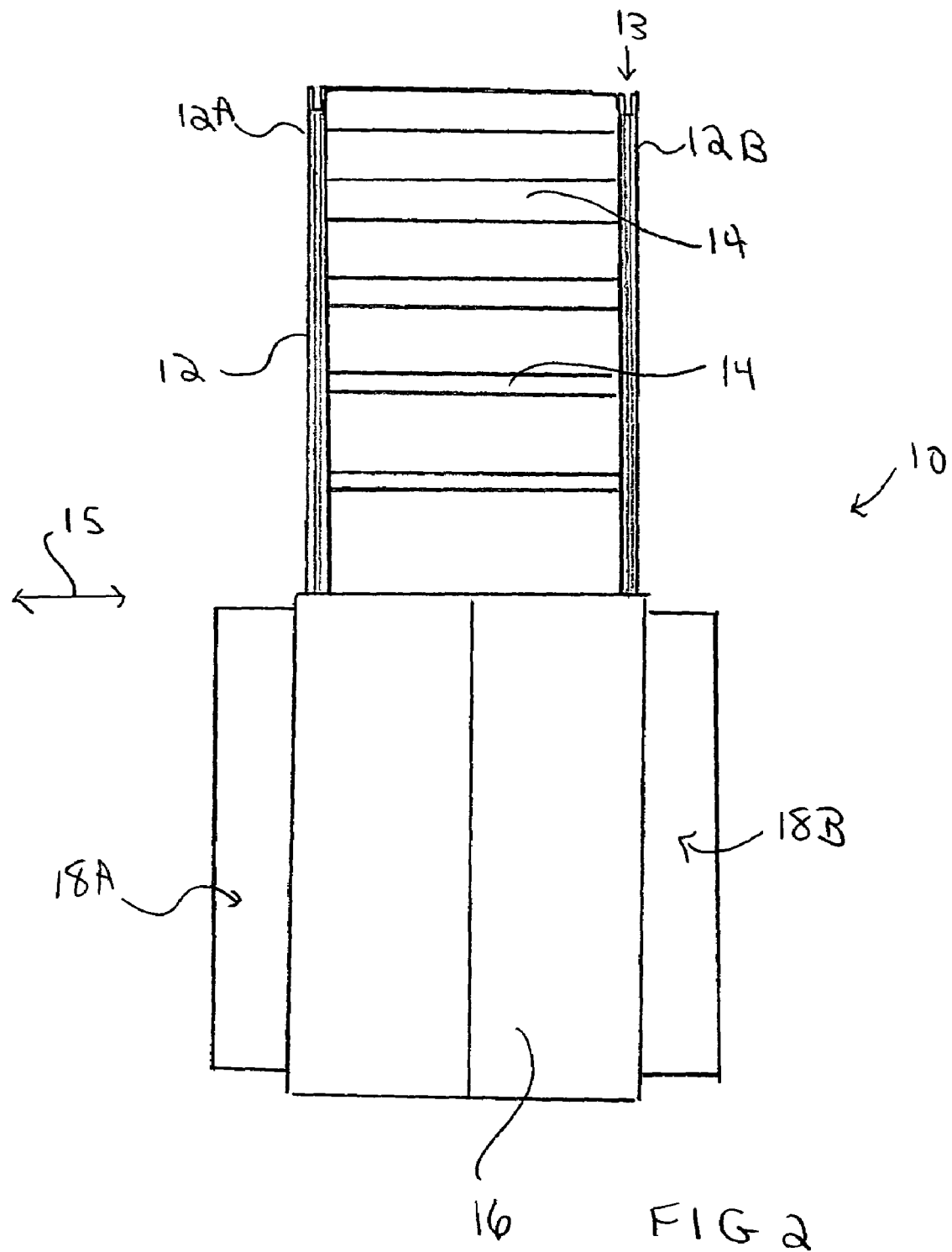
FIG. 2 is a front elevation view corresponding to FIG. 1.

Referring first to FIGS. 1 to 4, a wind turbine 10 is provided. Wind turbine 10 includes a rotatable frame 12 and a plurality of airfoils 14 mounted thereto. Frame 12 preferably includes two parallel circular rotatable members 12A and 12B. Frame 12 rotates about a central horizontal axis 15. As can be seen in FIG. 2, airfoils 14 are disposed parallel to axis of rotation 15. Airfoils 14 span (horizontally) between the first and second rotatable members 12A and 12B. First and second rotatable members 12A and 12B are preferably disposed parallel to one another. Thus, first and second rotatable members 12A and 12B rotate together about a common horizontal axis 15.

A wind block 16 is positioned to restrict airflow over at least a portion of the rotatable frame. Most preferably, wind block 16 covers the bottom half of the airfoils 14 on the front F of wind turbine 10 facing into wind W. As can be seen in FIG. 4, wind block 16 may be V-shaped such that it separates and diverts wind W into air ducts 18A and 18B respectively. As can be seen, air ducts 18A and 18B direct bypass air toward airfoils 14 at the back B of wind turbine 10.

As a result, air flow directed across the entire front of wind turbine 10 is used to turn rotatable frame 12. Specifically, wind W directed at the top half of wind turbine 10 is directed to airfoils 14 at front F of the device, whereas wind W directed at the bottom half of wind turbine 10 is directed by bypass ducting to airfoils 14 at back B of the device. Wind W causes airfoils 14 at front F to move upwardly, and airfoils 14 at back B to move downwardly. Thus, wind W perpendicular to axis of rotation 15 causes frame 12 to rotate in a clockward direction R. In an optional alternate embodiment of the present invention, airfoils 14 are attached to rotatable frame members 12A and 12B with their curvature reversed, thus causing rotatable frame 12 to rotate in the opposite (counterclockwise) direction.

Figure 3:
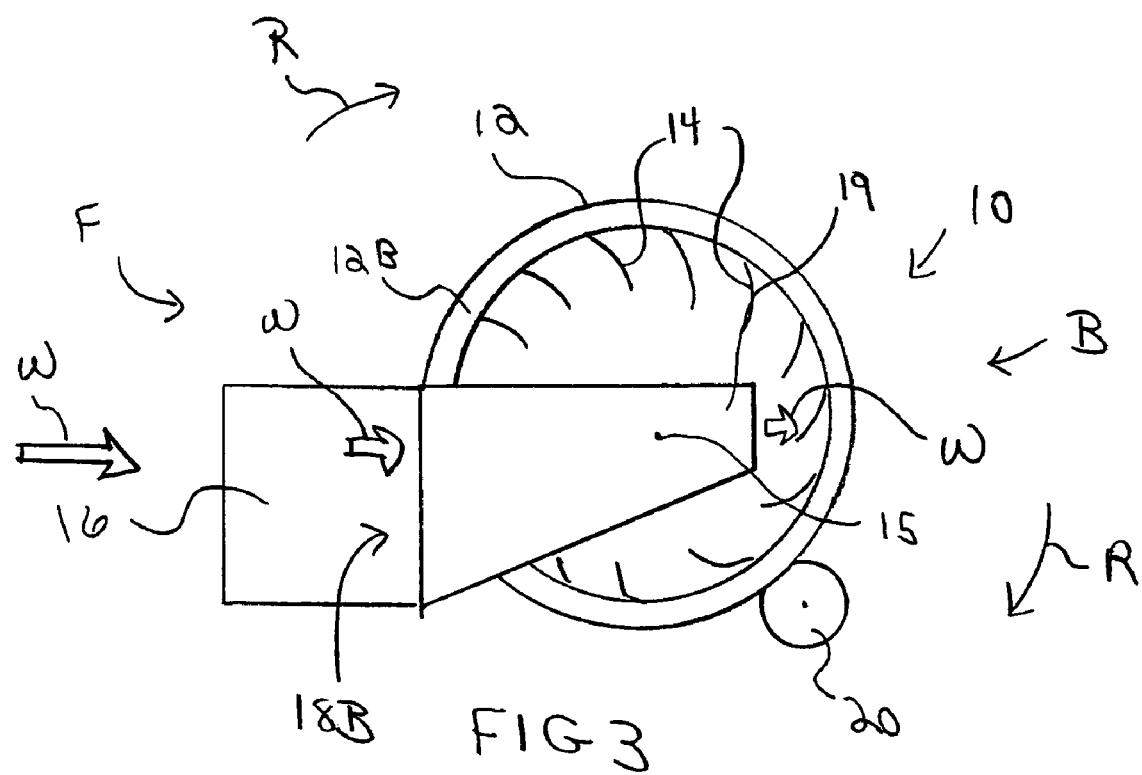
FIG. 3 is a side elevation view corresponding to FIG. 1.

As seen in FIGS. 1 and 3, the interior area of rotatable frame 12 is free of moving structural members. Therefore, as shown in the cut away view of FIG. 4, the back ends of air ducts 18A and 18B can be positioned within rotatable frame 12. The back end of each air duct 18 may optionally include an adjustable baffle 19. The present inventor has experimentally determined that the rotational speed of rotatable frame 12 can be adjusted by opening/closing baffles 19. In optional embodiments, adjustable baffles may instead be positioned on the front (i.e.: inlet) ends of air ducts 18.

A further advantage of the present invention is that wind W passes fully through the device. Specifically, in addition to the "bypass air" being directed through air ducts 18 straight to airfoils 14 at back B of the device, any wind W hitting airfoils 14 at front F of the device also passes through rotating frame 12 and thus it hits airfoils 14 at both the front F and the back B of the device. As a result, power can be generated from wind acting at both front F and back B of the device.

A further feature of the present invention is its use of airfoils 14 to catch the wind and rotate frame 12. As understood herein, an "airfoil" is any structure that creates lift by wind passing thereover. An advantage of using an airfoil 14 design is that it permits air passage thereover such that a pressure differential exists between the top and bottom surface of the airfoil. Specifically, air passes a greater distance over the top of the airfoil than over its bottom surface. As a result, the air moves at a greater speed across the top of the airfoil, resulting in a lower pressure, thus giving "lift" to the airfoil. A wing on an aircraft is an example of such an "airfoil".

A further advantage of using airfoils (as opposed to a "bucket-type" of air flow capture system) is that the air quickly passes between adjacent airfoils 14 as it passes through wind turbine 10 from front F to back B. Such air flow passing through the device can act on airfoils 14 at both the front F and back B of the device. Thus, the use of airfoils represents an advantage over a "bucket-type" air flow capture systems that rely on trapping air flow.

As seen in FIGS. 3 and 4, a generator drive wheel 20 is positioned in contact with rotatable frame 12. As illustrated, generator drive wheel 20 is positioned in contact with frame member 12B. In optional preferred embodiments, generator drive wheel 20 is received within a narrow groove 13 of frame member 12B. It is to be understood that separate generator drive wheels 20 may be placed into contact with both) of frame members 12A or 12B. Moreover, more than one drive wheel 20 may be placed in contact with each of frame members 12A and/or 12B. Drive wheel 20 is connected to an electrical generator. In various embodiments of the invention, various wheels that support rotatable frame 12 but are not connected to the generator may be used. In optional embodiments, the same wheel(s) may be used to both support the rotatable frame and drive the generator.

A second embodiment of the invention is seen in FIGS. 5 and 6. A circular rotatable frame 40 is provided. A propeller 42 is disposed within frame 40. Frame 40 and propeller 42 rotate together about horizontal axis 45. In accordance with this embodiment of the invention, wind W flow directed towards the front F of the device causes propeller 42 to rotate. Thus, air flow parallel to axis of rotation 45 causes the device to operate.

As can be seen, one or more generator drive wheels 20 are provided to translate the rotation of frame 40 into electrical power. As can also be seen, alignment wheels 22 may also be used to hold rotatable frame 40 against drive wheels 20.

What is claimed is:

1. A wind turbine, comprising: a rotatable frame; a plurality of airfoils mounted to the rotatable frame, wherein the airfoils extend parallel to an axis of rotation of the rotatable frame; a wind block positioned to restrict airflow over at least a portion of the rotatable frame; at least one drive wheel in contact with the rotatable frame; and at least one air duct for directing air flow from a front of the rotatable frame towards a back of the rotatable frame, wherein the at least one duct comprises a pair of air ducts on opposite sides of the rotatable frame.

2. A wind turbine, comprising: a rotatable frame; a plurality of airfoils mounted to the rotatable frame, wherein the airfoils extend parallel to an axis of rotation of the rotatable frame; a wind block positioned to restrict airflow over at least a portion of the rotatable frame; at least one drive wheel in contact with the rotatable frame; and at least one air duct for directing air flow from a front of the rotatable frame towards a back of the rotatable frame, wherein the at least one air duct is at least partially received within a hollow interior of the rotatable frame.

3. The wind turbine of claim 1 or 2, wherein the rotatable frame comprises: a first circular rotatable member; and a second circular rotatable member, wherein the airfoils span between the first and second rotatable members.

4. The wind turbine of claim 3, wherein the first and second rotatable members are parallel to one another.

5. The wind turbine of claim 1 or 2, wherein the rotatable frame rotates around a horizontal axis.

6. The wind turbine of claim 1 or 2, wherein each of the airfoils are horizontal.

7. The wind turbine of claim 1 or 2, wherein air flow perpendicular to the axis of rotation of the rotatable frame causes the rotatable frame to rotate.

8. The wind turbine of claim 1 or 2, wherein the wind block restricts airflow over at least one half of the rotatable frame.

9. The wind turbine of claim 1 or 2, further comprising: at least one alignment wheel positioned to urge the rotatable frame into contact with the drive wheel.

* * * * *